Nov. 5, 1935.  W. S. WATTS  2,019,552

INDIVIDUAL CUP FOR ICE CREAM

Original Filed March 26, 1932

Inventor:
Warren S. Watts
By [signature]
Atty.

Patented Nov. 5, 1935

2,019,552

UNITED STATES PATENT OFFICE 2,019,552

INDIVIDUAL CUP FOR ICE CREAM

Warren S. Watts, Montclair, N. J., assignor to United States Foil Company, Jersey City, N. J., a corporation of Delaware Original application March 26, 1932, Serial No. 601,349. Divided and this application April 19, 1933, Serial No. 666,842

1 Claim. (Cl. 206—46)

This invention has to do with a container for a frozen confection and relates particularly to a cup of thin wall structure for dispensing ice cream and similar frozen edible material, and is a division of application Serial Number 601,349, filed March 26, 1932, in the name of Warren S. Watts, and entitled Process of packaging confections.

Present methods of producing small individual service ice cream paper cups involves an elaborate and expensive plant. Mechanical equipment of a high order is required to produce water-tight and moisture-proof cups for ice cream, ices, sherbets, and like frozen edible materials. In order to produce a satisfactory individual service ice cream paper cup more economical of manufacture and possessing new and useful novelty and attraction, the invention herein disclosed comprises a combination consisting of a thin water-proof paper liner with or without fluted side walls which liner directly contains the solid frozen ice cream, and an outer cup of heavy cardboard or similar construction which serves as a carrier for the thin fluted liner and its contents.

This construction obviates the necessity for the outer and more expensive cup to be water proof and thus permits of the use of a much cheaper and more readily made package.

Much quicker freezing is facilitated by the use of thin fluted paper liners in the hardening room due to their very thin walls and fluted sides which readily admit the cold to all surfaces of the same.

Another object of the present invention is to provide for a frozen confection, a lightweight cup suitable for containing the confection during the coagulating stage.

Another object of the present invention is to provide a cup of thin wall structure suitable for containing a confection during a freezing process, and suitable for dispensing the confection.

Another object of the present invention is to provide a thin walled cup for containing a frozen confection and dependent upon the solidity of the confection for the reinforcement of said cup.

Another object of the present invention is to provide a cup for the individual dispensing of a frozen confection, the cup comprising an inner thin walled receptacle impervious to moisture, and an outer casing for excluding heat, the latter lending strength and attractiveness to the cup.

Another object of the present invention is to provide a dual or duplex cup for ice cream and like frozen edible materials whereby the inner corrugated thin paper receptacle may be used as a single or individual service of the produce for table use by discarding the outer carrier or reinforcing up.

Another object of the present invention is to provide a combination cup which is readily adaptable to giving the consumer a moulded form or portion of ice cream, or the like, having attractive and fluted walls when the inner crimped or fluted paper cup is pulled off of the frozen contents, for which the inner corrugated paper cup served as a mould to decorate the frozen contents thereof.

These objects and other desirable objects embodied within the invention are made apparent in the following description which is to be read in conjunction with the accompanying drawing comprising a single sheet, hereby made a part of this specification, and in which.

Like reference characters designate similar parts throughout the following description and in the drawing.

Figure 1:
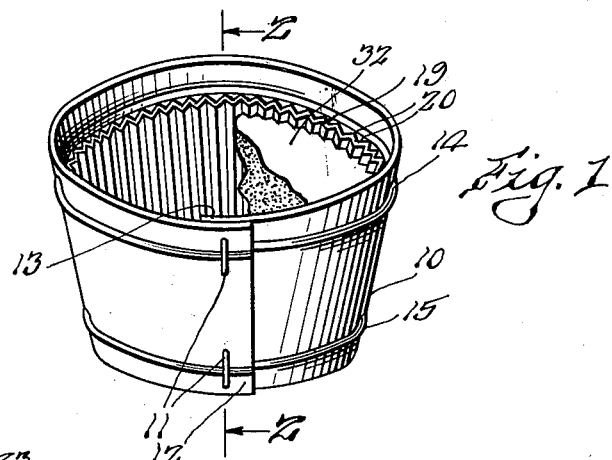
Figure 1 is a perspective view of a cup embodying the invention with parts broken away for better illustration.
Figure 2:
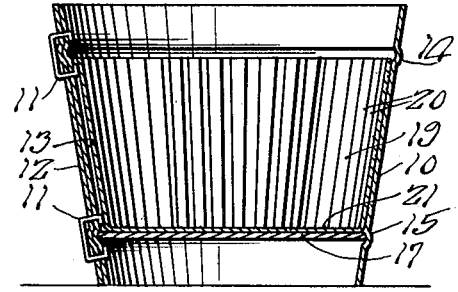
Figure 2 is a sectional view of the cup shown in Figure 1 taken along the line 2—2.

Reference is first to be had to Figures 1 and 2 and particularly to a coniform jacket or casing 10 shown therein. The jacket 10 is preferably rolled into shape from a flat sheet of heavy fibrous material which has previously been cut to the proper shape. Staples 11 may serve as a means for effectively holding the jacket into a desired rolled position. Overlapping edges 12 and 13 are transversed by the staples 11. While still in the flat sheet form, the casing 10 is treated by any type of a machine having crimping rollers, or other suitable crimping means, for impressing the beads 14 and 15 therein.

A circular bottom member 17 of a diameter to fit snugly into the outwardly disposed bead 15 is provided. A material similar to that comprising the jacket 10 may serve for the bottom member 17. The convergent wall structure of the jacket 10 assists the groove 15 to confine the circular bottom piece, and should the bottom piece be pressed downwardly beyond the groove 15 the jacket walls of smaller diameter therebelow will support it.

For resting upon the bottom 17 of the cup formed of jacket 10 and bottom 17 is an inner receptacle 19. The receptacle 19 has corrugated sides 20 struck up from the edge of a circular bottom 21, and at a divergent angle to lie contiguous to the inner side of the jacket 18. A material similar to a thin waxed or paraffined paper is desirable for the body of the receptacle 19. The receptacle 19 preferably is moisture proof.

Figure 3:
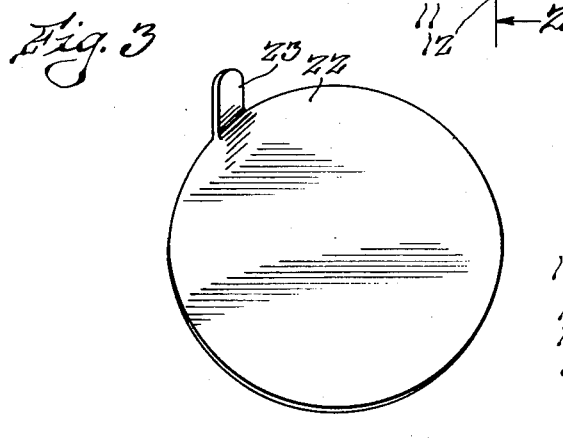
Figure 3 is a view taken in perspective of a cover for the cup shown in Figure 1.

It will be noted in Figure 2 that the top edge of the sides 20 just reaches to the lower edge of the bead 14, thus permitting a lid 22, shown in Figure 3, to be seated thereabove in the groove provided by the bead 14.

The lid 22 is identical in construction with the bottom 17 except that the former is somewhat greater in diameter. A tongue 23, which may be integral with the body of the lid 22, is articulated upwardly from the edge thereof to facilitate removing the said lid from its seated position in the groove 14.

Figure 4:
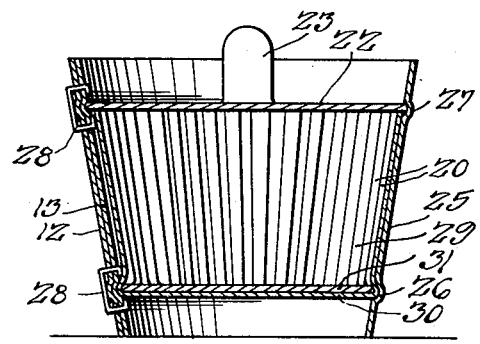
Figure 4 is a sectional view of a different form of cup taken in central elevation.

A cup in slight modification to the form of cup above described is illustrated in Figure 4. The modified form of the invention includes a jacket 25 provided with grooves 26 and 27 and is held in assembly by staples 28 in exactly the same manner as the before described jacket.

Within the jacket or casing 25 is placed a paper basket 29 which is identical to the previously described receptacle 19. Placed in juxtaposition to the bottom 30 of the basket or receptacle 29 and on its inner side is a reinforcing disc 31. The disc 31 may be made from a fibrous material of a character like that of jacket 25.

When the receptacle 29 is inserted into the jacket 25, a slight urge (as by the finger tip) will cause the disc 31 to deform the thin body of the receptacle adjacent the peripheral edge of the disc incident to the pressing of the said disc into the groove 26. The upper edge of the receptacle 29 falls short of the groove 27 so that the lid 22 may be pressed into the groove.

In Figure 1, the cup 19 is partly filled with ice cream 32. Anterior to the pouring of the ice cream mix into the receptacle 19 or 29, the receptacles are placed into a rigid mould in conformity with the fluted walls of the receptacles. The ice cream when poured into the receptacles is a soft mix run from the freezers and before the hardening process has been started.

The mix in this soft state flows into the interstices of the fluted side walls of the receptacles. An unfilled portion may be left at the top of the receptacles to be subsequently filled by a coat or batch of flavoring such as chocolate or other flavored material.

The mould, not shown, and which may accommodate a number of the receptacles for filling with ice cream mix, when loaded, is placed in a cooling compartment for hardening the ice cream.

The ice cream and flexible receptacle becomes frozen en masse so that the margin of the receptacle projecting above the surface of the ice cream is in effect a short sleeve, with anchorage to the side surfaces of the ice cream. The corrugation in the receptacle walls in the upwardly projecting margins act as reinforcing ribs to thus make the marginal walls sufficiently strong for holding the flavoring layer, even though the paper may be relatively light or thin.

If the flavoring layer is used and has been added to the top of the hardened ice cream the lids 22 are pressed into place. The confection is then ready for sale.

The present invention is especially advantageous for the reason that a chocolate of a higher melting temperature may be applied to the ice cream. Dripping of the flavoring product from the mass of the ice cream is precluded by the upwardly projecting walls of the receptacle, and the confection material is thus held in place until it congeals.

What is claimed as new and is desired to be secured by Letters Patent of the United States is:

The combination with a frozen confection, liquid at normal temperatures, of a receptacle of thin water-proof paper having fluted walls, the paper being too fragile to support the confection material in its unfrozen state and, the confection material when solidified being of a predetermined configuration coinciding with the configuration of and filling said receptacle, the paper walls of said receptacle adhering to said frozen confection for maintaining the configuration of and the flutings in said receptacle, an outer casing about said receptacle and in contact with the outer edges of the flutings thereof and extending above and below the top and bottom of said receptacle, said casing having circumferential beadings immediately above and below the top and bottom of said receptacle and spaced from the top and bottom edges of said casing, a bottom member for said casing in the lower beading and supporting the entire bottom of said receptacle, and a top member for said casing in the top beading and sealing the top of said receptacle, the top and bottom members being removed from the top and bottom edges of said casing a distance at least equal to the greatest depth of the flutings in the side wall of said receptacle.

WARREN S. WATTS.